(12) United States Patent
Lee et al.

(10) Patent No.: US 12,715,795 B2
(45) Date of Patent: Aug. 25, 2026

(54) SOFT-WATER SYSTEM

(71) Applicant: KYUNGDONG NAVIEN CO., LTD., Gyeonggi-do (KR)

(72) Inventors: Soo Young Lee, Seoul (KR); Tae Seong Kwon, Seoul (KR); Seung Kil Son, Seoul (KR)

(73) Assignee: KYUNGDONG NAVIEN CO., LTD., Gyeonggi-do (KR)

( * ) Notice: Subject to any disclaimer, the term of this patent is extended or adjusted under 35 U.S.C. 154(b) by 1341 days.

(21) Appl. No.: 16/961,967

(22) PCT Filed: Feb. 13, 2019

(86) PCT No.: PCT/KR2019/001762
§ 371 (c)(1),
(2) Date: Jul. 14, 2020

(87) PCT Pub. No.: WO2019/164175
PCT Pub. Date: Aug. 29, 2019

(65) Prior Publication Data

US 2020/0346952 A1 Nov. 5, 2020

(30) Foreign Application Priority Data

Feb. 23, 2018 (KR) ........................ 10-2018-0022193

(51) Int. Cl.
*C02F 1/469* (2023.01)
*C02F 1/00* (2023.01)
(Continued)

(52) U.S. Cl.
CPC ............ *C02F 1/4691* (2013.01); *C02F 1/001* (2013.01); *C02F 1/006* (2013.01); *C02F 1/008* (2013.01);
(Continued)

(58) Field of Classification Search
CPC ............................................. C02F 1/469–4698
See application file for complete search history.

(56) References Cited

U.S. PATENT DOCUMENTS 3,630,378 A * 12/1971 Bauman .................. C02F 1/441 210/257.2
2013/0105323 A1 * 5/2013 Averbeck ................ C02F 1/008 204/555
(Continued)

FOREIGN PATENT DOCUMENTS

KR 10-2002-0078954 A 10/2002
KR 10-0498861 7/2005
(Continued)

OTHER PUBLICATIONS

International Search Report mailed May 15, 2019; Application Serial No. PCT/KR2019/001762; in the name of Kyungdong Navien Co., Ltd.

*Primary Examiner* — Luan V Van
*Assistant Examiner* — Andrew Koltonow

(57) ABSTRACT

Provided is a soft-water system which connects to a main channel for supplying raw water to a place of consumption, removes at least a part of an ionic material contained in the raw water supplied through the main channel, and supplies soft water containing less ionic material than the raw water to the place of consumption. The soft-water system includes: a filter portion which receives supplied water derived from raw water, removes at least a part of an ionic material contained in the supplied water on the basis of electric power, and discharges first soft water containing less ionic material than the supplied water; and a storage portion which receives and stores the first soft water and discharges second soft water derived from the stored first soft water,
(Continued)

wherein at least one of the first soft water and the second soft water is supplied to a place of consumption.

17 Claims, 16 Drawing Sheets

(51) Int. Cl.
*C02F 1/46* (2023.01)
*C02F 5/00* (2023.01)
*C02F 101/10* (2006.01)

(52) U.S. Cl.
CPC .............. *C02F 1/4602* (2013.01); *C02F 5/00* (2013.01); *C02F 2101/10* (2013.01); *C02F 2209/055* (2013.01); *C02F 2209/40* (2013.01); *C02F 2303/16* (2013.01)

(56) References Cited

U.S. PATENT DOCUMENTS

| | | | | |
|---|---|---|---|---|
| 2016/0010222 | A1* | 1/2016 | Jha | C02F 1/4693<br>205/746 |
| 2016/0289097 | A1* | 10/2016 | Jeong | C02F 1/4691 |
| 2016/0368790 | A1* | 12/2016 | Son | C02F 1/4691 |

FOREIGN PATENT DOCUMENTS

| | | | | |
|---|---|---|---|---|
| KR | 10-2008-0102079 | | 11/2008 | |
| KR | 10-0934161 | | 12/2009 | |
| KR | 10-1227854 | | 1/2013 | |
| KR | 10-2013-0123737 | | 11/2013 | |
| TW | M283976 | * | 10/2009 | F24H 9/02 |
| WO | WO-2012161534 A2 | * | 11/2012 | B01D 35/14 |
| WO | WO-2014150783 A1 | * | 9/2014 | C02F 1/4602 |

* cited by examiner

SOFT-WATER SYSTEM

TECHNICAL FIELD

The present disclosure relates to a water softening system.

BACKGROUND ART

Ionic materials such as calcium ions ($Ca^{2+}$), magnesium ions ($Mg^{2+}$), or the like are contained in general tap water. The water containing the ionic materials may cause damage to skin or fiber. Furthermore, the calcium ions ($Ca^{2+}$) may be precipitated as calcium carbonate ($CaCO_3$) by heat, and the precipitated calcium carbonate ($CaCO_3$) may be stuck to a pipe through which the water flows. Due to the sticking, there may be cracks in the pipe.

Accordingly, a water softening system that removes ionic materials from water containing the ionic materials is used. In the related art, a water softening system that removes ionic materials using an ion exchange resin is used. However, the water softening system in the related art has problems in that salt has to be consistently added for operation and therefore water from which ionic materials are removed contains salt and is difficult to use as drinking water. In addition, wastewater discarded after the ionic materials are removed may cause environmental pollution.

DISCLOSURE

Technical Problem

An aspect of the present disclosure provides a water softening system for solving at least one of the aforementioned problems.

Technical Solution

In an embodiment, a water softening system that is connected to a main line for supplying raw water to a consumption site and that removes at least part of an ionic material contained in the raw water supplied through the main line and supplies soft water containing a smaller amount of ionic material than the raw water to the consumption site includes a filter device that receives water derived from the raw water, removes at least part of an ionic material contained in the received water based on an electric force, and releases first soft water containing a smaller amount of ionic material than the received water and a reservoir that stores the first soft water supplied from the filter device and releases second soft water derived from the stored first soft water, and at least one of the first soft water or the second soft water is supplied to the consumption site.

Advantageous Effects

According to the present disclosure, the water softening system removes the ionic material based on the electric force and therefore may be more convenient than the water softening system in the related art that has to consistently supply salt.

In addition, according to the present disclosure, the water softening system may supply the soft water stored in the reservoir to the consumption site as needed and therefore may supply a larger amount of soft water to the consumption site than in the related art.

MODE FOR INVENTION

Figure 1:
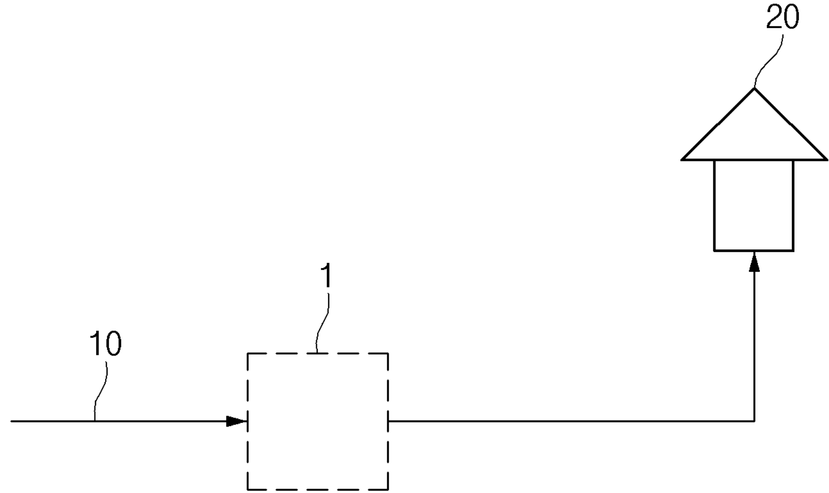
FIG. 1 is a schematic view illustrating a state in which a water softening system according to embodiment 1 of the present disclosure is installed.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

Embodiment 1

Figure 2:
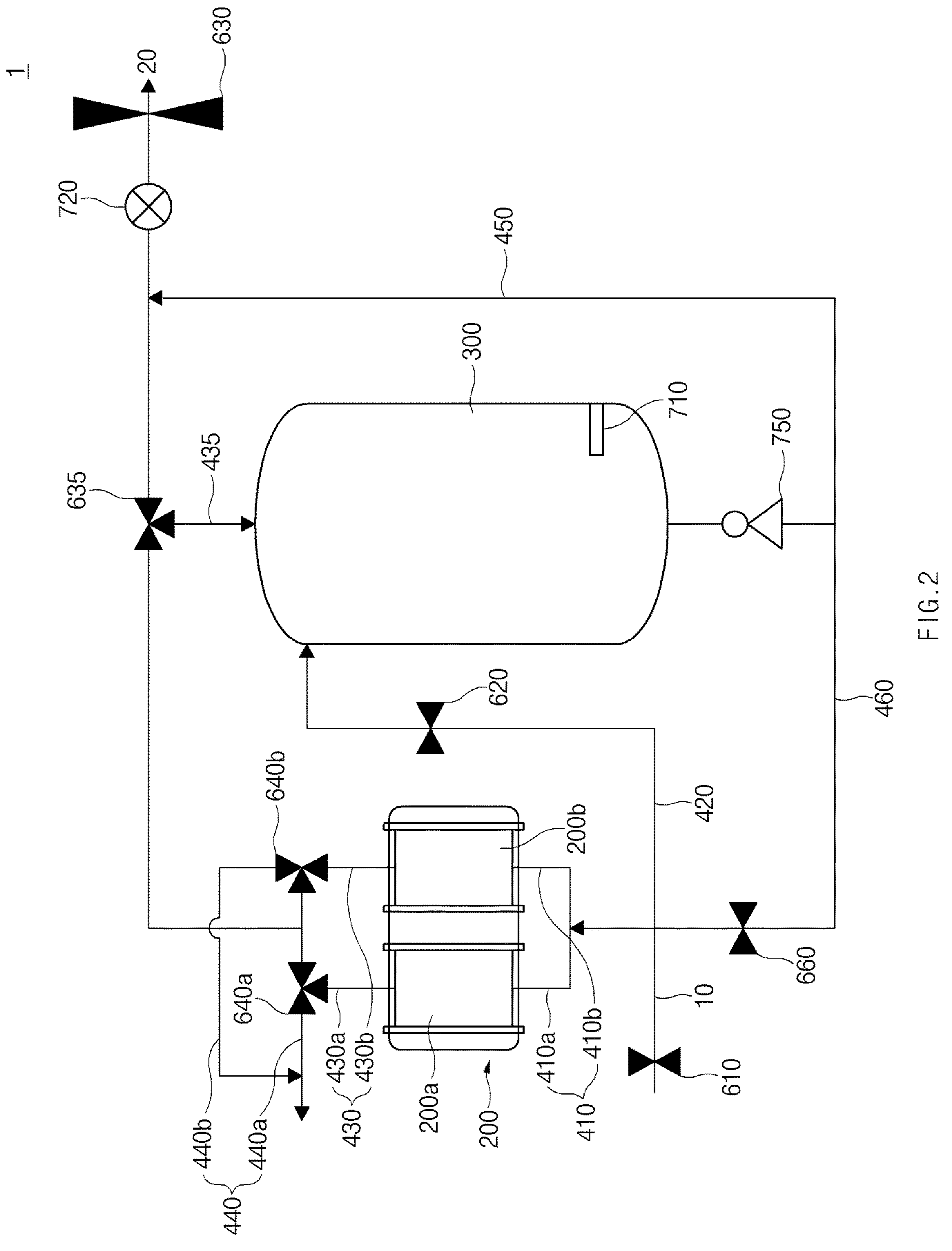
FIG. 2 is a view illustrating a configuration of the water softening system according to embodiment 1 of the present disclosure.

FIG. 1 is a schematic view illustrating a state in which a water softening system according to embodiment 1 of the present disclosure is installed. FIG. 2 is a view illustrating a configuration of the water softening system according to embodiment 1 of the present disclosure. Hereinafter, the water softening system according to embodiment 1 of the present disclosure will be described with reference to FIGS. 1 and 2.

As illustrated in FIG. 1, raw water such as tap water is supplied to a consumption site 20 along a main line 10. The consumption site 20 may be an ordinary home. The water softening system 1 according to embodiment 1 of the present disclosure is connected to the main line 10 and removes at least a part of ionic materials contained in the raw water supplied through the main line 10. Accordingly, soft water containing a smaller amount of ionic materials than the raw water is released from the water softening system 1 and supplied to the consumption site 20.

The water softening system 1 provided in front of a raw water inlet of the consumption site 20 to remove all ionic materials in the raw water to be supplied to the consumption site 20 is referred to as a Point Of Entry (POE) water softening system, and the water softening system 1 according to embodiment 1 of the present disclosure may be a POE water softening system.

Referring to FIG. 2, the water softening system 1 according to embodiment 1 of the present disclosure includes a filter device 200 and a reservoir 300. To form a fluid channel, the water softening system 1 of this embodiment may further include a first supply line 410, a second supply line 420, a first discharge line 430, a drain line 440, a branch line 435, a second discharge line 450, and a recovery line 460.

Because the POE water softening system needs to treat all the raw water to be supplied to the consumption site, the POE water softening system has to treat a relatively large amount of raw water. To this end, the water softening system 1 according to embodiment 1 of the present disclosure includes the filter device 200 and the reservoir 300. The raw water flowing along the main line 10 may be released as first soft water through the filter device 200 and may be directly supplied to the consumption site 20 or may be supplied to the reservoir. Alternatively, the raw water, after supplied to the reservoir 300, may be released as second soft water from the reservoir 300 and may be supplied to the consumption site 20. That is, at least one of the first soft water or the second soft water may be supplied to the consumption site 20. The filter device 200 and the reservoir 300 will be described below in more detail.

The first supply line 410 refers to a line for supplying the raw water from the main line 10 to a front end of the filter device 200. The filter device 200 may include a plurality of filter modules 200*a* and 200*b* as will be described below, and the first supply line 410 may be split into a plurality of lines to supply the raw water to the filter modules 200*a* and 200*b*. A main valve 610 may be provided in the main line 10, and the raw water may or may not be supplied to the water softening system 1 depending on opening or closing of the main valve 610.

The second supply line 420 refers to a line that branches off from the first supply line 410 or the main line 10 and supplies the raw water to the reservoir 300. A second supply valve 620 may be provided in the second supply line 420, and the raw water may or may not be supplied to the reservoir 300 depending on opening or closing of the second supply valve 620.

The first discharge line 430 refers to a line that guides the water released from the filter device 200 to the consumption site 20, and the drain line 440 refers to a line that branches off from the first discharge line 430 to connect to the outside and drains the water released from the filter device 200 to the outside. The first discharge line 430 may also include a plurality of lines 430*a* and 430*b* connected to the plurality of filter modules 200*a* and 200*b*, and the plurality of lines may be integrated into one line and may be guided to the consumption site. The drain line 440 may also branch off from the plurality of first discharge lines 430*a* and 430*b* connected to the plurality of filter modules 200*a* an 200*b*.

A first discharge valve 630 may be provided at a distal end on a downstream side of the first discharge line 430, and the water flowing along the first discharge line 430 may or may not be supplied to the consumption site 20 depending on opening or closing of the first discharge valve 630.

A three-way valve may be provided as a drain valve 640 at the point where the first discharge line 430 and the drain line 440 meet, and the direction of the water released from the filter device 200 may be determined by opening the drain valve 640 toward the consumption site 20 or by opening the drain valve 640 toward the drain line 440. However, the drain valve 640 does not need to be necessarily a three-way vale, and valves for opening or closing a plurality of drain lines 440*a* and 440*b*, respectively, may be used.

The branch line 435 refers to a line that branches off from the first discharge line 430 and connects to the reservoir 300. A three-way valve may be provided as a branch valve 635 at the point where the first discharge line 430 and the branch line 435 meet, and the direction in which the first soft water released from the filter device 200 is supplied may be determined by opening the branch valve 635 toward the consumption site 20 or by opening the branch valve 635 toward the reservoir 300. However, the branch valve 635 does not need to be necessarily a three-way valve, and valves for opening or closing the first discharge line 430 and the branch line 435 may be provided to play the same role.

The second discharge line 450 refers to a line connected from the reservoir 300 to the first discharge line 430. A discharge pump 750 may be provided in the second discharge line 450, and the second soft water may be released from the reservoir 300 by operation of the discharge pump 750. However, when the raw water is supplied along the main line 10 and therefore water is supplied to the reservoir 300, the second soft water may be released from the reservoir 300 by the pressure by which the water is supplied, and therefore the discharge pump 750 may not necessarily operate for release of the second soft water.

The recovery line 460 refers to a line connected from the reservoir 300 to the first supply line 410. As illustrated in FIG. 2, the recovery line 460 may branch off from the second discharge line 450 and may be provided separately from the second discharge line 450 to connect the reservoir 300 and the first supply line 410. A recovery valve 660 may be provided in the recovery line 460, and when the recovery line 460 branches off from the second discharge line 450, the second soft water released from the reservoir 300 may be supplied to the recovery line 460 or the second discharge line 450, depending on opening or closing of the recovery valve 660.

Meanwhile, the first discharge valve 630 may be provided in the first discharge line 430 so as to be located downstream of the point where the first discharge line 430 and the second discharge line 450 meet. Accordingly, the second soft water released from the reservoir 300 may flow into the recovery line 460 when the branch valve 635 is closed in the direction toward the consumption site 20, the first discharge valve 630 is also closed, and the recovery valve 660 is open.

Furthermore, a flow sensor 720 may be provided in the first discharge line 430 so as to be located downstream of the point where the first discharge line 430 and the second discharge line 450 meet, and the flow sensor 720 may measure the amount of water that is supplied to the consumption site 200.

Furthermore, a filter (not illustrated) that removes physical foreign matter such as rust may be provided in front of the water softening system 1, that is, in the main line 10 and/or behind the water softening system 1. The filter may be a carbon filter. The filter provided in the main line 10 may prevent physical foreign matter contained in the raw water from being supplied to the water softening system 1, and the filter provided behind the water softening system 1 may prevent physical foreign matter contained in the soft water from being supplied to the consumption site 20.

Hereinafter, the filter device 200 and the reservoir 300 will be described in more detail.

Filter Device 200

The filter device 200 receives water derived from the raw water, removes ionic materials contained in the received water, and releases the first soft water containing a smaller amount of ionic materials than the received water. Here, the water derived from the raw water may include both water directly supplied from the main line 10 and water that the reservoir 300, which will be described below, receives from the main line 10 and releases to the filter device 200.

The filter device 200 removes the ionic materials in the water derived from the raw water, based on an electric force. More specifically, there is an electro-deionization method among methods of removing ionic materials. When DC voltage is applied to charged particles in an electrolyte, positively charged particles move to a negative electrode, and negatively charged particles move to a positive electrode. This is called electrophoresis. The electro-deionization method refers to a method of removing ions (ionic materials) in water by selectively adsorbing or moving the ions (the ionic materials) in the water through electrodes or an ion exchange membrane, based on the principle of electrophoresis.

The electro-deionization method includes Electrodialysis (ED), Electro Deionization (EDI), Continuous Electro Deionization (CEDI), Capacitive Deionization (CDI), or the like. A filter device of an ED type includes electrodes and an ion exchange membrane. Further, a filter device of an EDI type includes electrodes, an ion exchange membrane, and an ion exchange resin. In contrast, a filter device of a CDI type does not include an ion exchange membrane or an ion exchange resin.

The filter device 200 according to embodiment 1 of the present disclosure may remove ionic materials using Capacitive Deionization (CDI) among the aforementioned electro-deionization methods. The CDI refers to a method of removing ions using a principle by which ions (or ionic materials) are adsorbed on or desorbed from surfaces of electrodes by an electric force.

Figure 3:
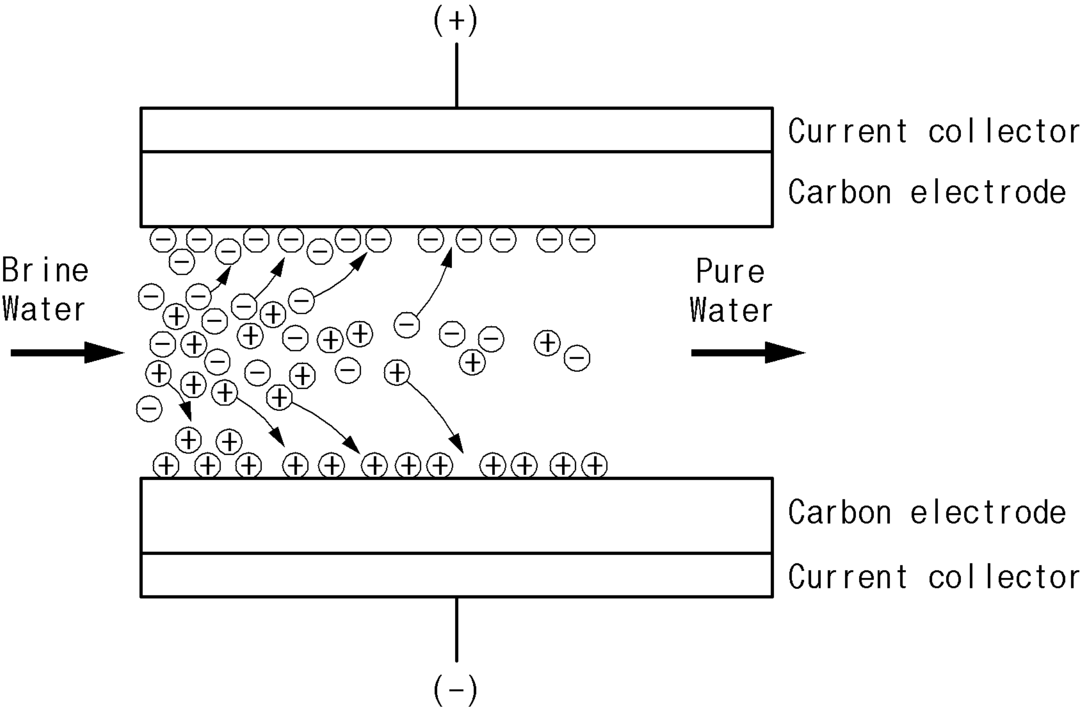
FIG. 3 is a schematic view illustrating a principle by which ions are removed in a CDI method.
Figure 4:
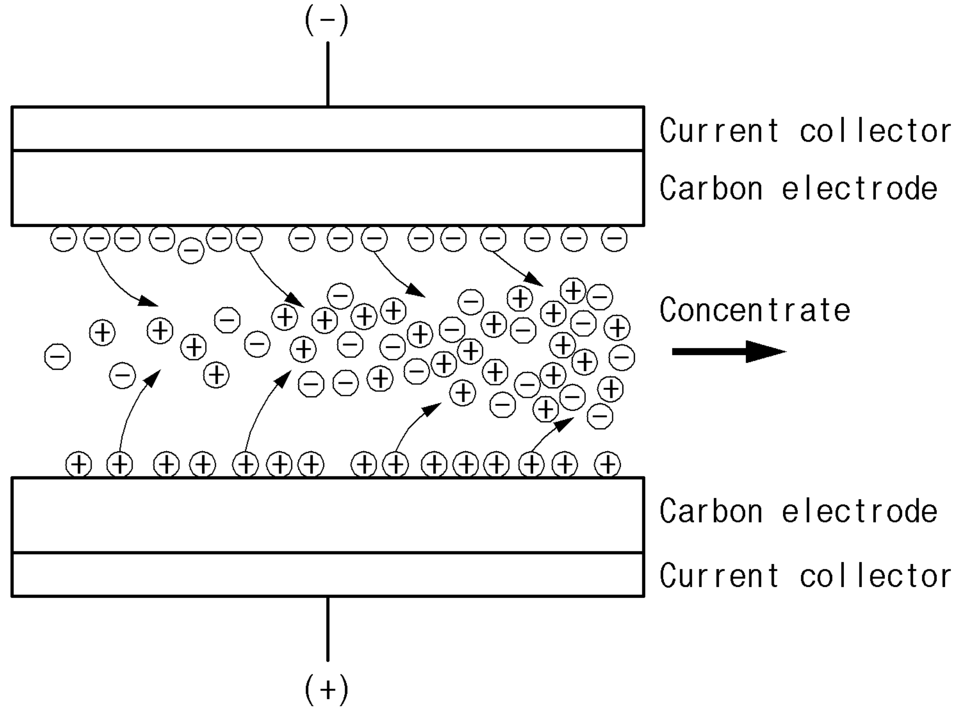
FIG. 4 is a schematic view illustrating a principle by which electrodes are regenerated in the CDI method.

FIG. 3 is a schematic view illustrating a principle by which ions are removed in the CDI method. FIG. 4 is a schematic view illustrating a principle by which electrodes are regenerated in the CDI method. As illustrated in FIG. 3, when water containing ions passes between the electrodes in a state in which voltage is applied to the electrodes, negative ions move to the positive electrode, and positive ions move to the negative electrode. That is, adsorption occurs. The ions in the water may be removed by the adsorption. Hereinafter, a mode in which the filter device (the filter modules) removes, through the electrodes, the ions (the ionic materials) in the water passing through the filter device as described above is referred to as a removal mode.

However, the adsorption capacity of the electrodes is limited. Accordingly, as the adsorption continues, the electrodes can no longer adsorb ions. To prevent this, the electrodes need to be regenerated by detaching the ions adsorbed on the electrodes. To this end, as illustrated in FIG. 4, voltage opposite to that in the removal mode may be applied to the electrodes, or no voltage may be applied to the electrodes. Hereinafter, a mode in which the filter device (the filter modules) regenerates the electrodes as described above is referred to as a regeneration mode. The regeneration mode may be performed before or after the removal mode, and the time interval between the regeneration mode and the removal mode may be variously set.

Meanwhile, when the filter device has only a pair of electrodes, first soft water may not be released from the filter device when the filter device performs the regeneration mode. Accordingly, the filter device 200 of the water softening system 1 according to embodiment 1 of the present disclosure may include the plurality of filter modules 200*a* and 200*b* as illustrated in FIG. 2. The plurality of filter modules 200*a* and 200*b* may be provided in parallel such that inlets through which water is supplied connect to each other and outlets through which the water is released connect to each other.

Each of the plurality of filter modules 200*a* and 200*b* may selectively perform one of the removal mode and the regeneration mode. The number of filter modules provided in parallel is not specially limited.

Meanwhile, each of the plurality of filter modules 200*a* and 200*b* may be controlled such that time during which the removal mode is performed is longer than time during which the regeneration mode is performed. Accordingly, the amount of the first soft water released from the filter device 200 may increase. Further, the electrodes may be sufficiently regenerated in the regeneration mode for a relatively short period of time by performing control such that the magnitude of power supplied to the electrodes in the regeneration mode is greater than the magnitude of power supplied to the electrodes in the removal mode.

Because the filter device 200 removes the ionic materials while performing the regeneration mode and the removal mode, the water softening system 1 according to embodiment 1 of the present disclosure may alleviate inconvenience of having to consistently supply salt as in the water softening system in the related art that uses an ion exchange resin. Furthermore, as salt is not contained in the first soft water released from the filter device 200, the first soft water may be used as drinking water, and as only ions are contained in the water released when the filter device 200 performs the regeneration mode, environmental pollution depending on wastewater may be prevented from occurring as in the water softening system in the related art.

Meanwhile, as the water softening system 1 according to embodiment 1 of the present disclosure is a POE water softening system as described above, it is necessary to treat a large amount of raw water, and to this end, the water softening system 1 according to embodiment 1 of the present disclosure includes the reservoir 300.

Reservoir 300

Figure 5:
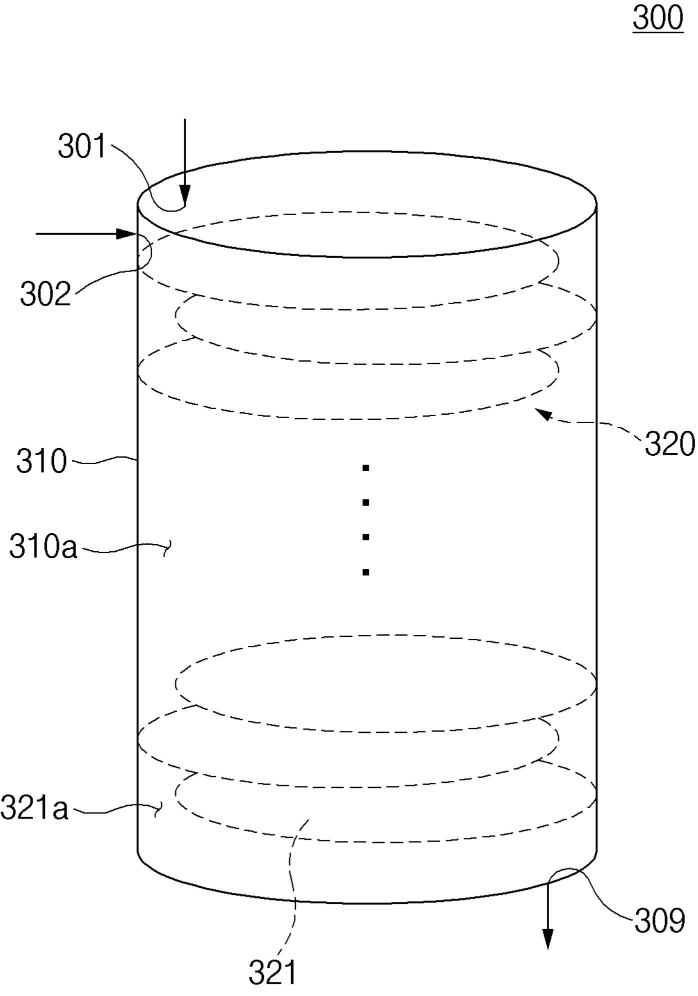
FIG. 5 is a perspective view illustrating a reservoir of the present disclosure.

FIG. 5 is a perspective view illustrating the reservoir of the present disclosure. The reservoir 300 may include a main body 310 having a storage space 310*a*, water inlets 301 an 302 provided at the main body 310 to supply water to the storage space 310*a*, and a water outlet 309 provided at the main body 310 to release soft water stored in the storage space 310*a* to the outside of the main body 310.

The reservoir 300 stores the first soft water supplied from the filter device 200 and releases the second soft water derived from the first soft water. In some cases, the raw water may also be supplied to the reservoir 300. The first soft water or the raw water may be supplied into the main body 310 through the water inlets 301 and 302, and the second soft water may be supplied to the consumption site 20 by being released to the outside of the main body 310 through the water outlet 309.

Because the second soft water is able to be supplied to the consumption site 20, a larger amount soft water may be supplied to the consumption site 20 than when only the first soft water released through the filter device 200 is supplied to the consumption site 20. That is, the reservoir 300 may serve to assist the filter device 200 when an amount that is difficult to receive in the filter device 200 is required to be supplied.

Meanwhile, as the soft water stored in the storage space 310*a* is released through the water outlet 309, it is necessary to supply supplementary water into the storage space 310*a* through the water inlets 301 and 302 such that water stored in the reservoir 300 always maintains a predetermined volume or more. This is especially true when the reservoir 300 is a tank of a closed type.

Meanwhile, although the second soft water is derived from the first soft water, the raw water may also be supplied to the reservoir 300 as supplementary water according to circumstances. Accordingly, to hinder the water supplied through the water inlets 301 and 302 from flowing toward the water outlet 309, the reservoir 300 may further include a partitioning part 320 that partitions the storage space 310*a*.

The partitioning part 320 is a component for partitioning the storage space 310*a*, and when the supplementary water is supplied into the storage space 310*a* through the water inlets 301 and 302 as the soft water stored in the storage space 310*a* is released through the water outlet 309, the partitioning part 320 may hinder the supplementary water from flowing toward the water outlet 309. That is, the partitioning part 320 may prevent the supplementary water and the soft water from being easily mixed with each other and may act such that the originally stored soft water is first released through the water outlet 309.

More specifically, the partitioning part 320 may include a partitioning plate 321 for partitioning the storage space 310*a*. The partitioning plate 321 may be formed to extend along an extension direction. Here, the extension direction refers to a direction across the direction toward the water outlet 309 from the water inlets 301 and 302, and as the partitioning plate 321 extends along the extension direction, the partitioning plate 321 may hinder the supplementary water from flowing toward the water outlet 309 from the water inlets 301 and 302.

Furthermore, a plurality of partitioning plats 321 may be installed on an inner surface of the main body 310 so as to be spaced apart from each other along the direction toward the water outlet 309 from the water inlets 301 and 302. As the plurality of partitioning plates 321 are provided to be spaced apart from each other along the direction toward the water outlet 309 from the water inlets 301 and 302, a flow of hard water toward the water outlet 309 from the water inlets 301 and 302 may be more assuredly obstructed.

Meanwhile, because the plurality of partitioning plates 321 prevent mixture of the supplementary water and the soft water, but should not completely block a water flow, the plurality of partitioning plates 321 may each include a partitioning passage 321*a* for a flow of water.

For example, the plurality of partitioning plates 321 may be installed on the inner surface of the main body 310 such that distal ends according to the extension direction are spaced apart from the inner surface of the main body 310. That is, the partitioning passage 321*a* may be formed between the distal end of each of the partitioning plates 321 and the inner surface. Alternatively, the partitioning passage 321*a* may be formed through the partitioning plate 321.

Meanwhile, whether to supply only the first soft water to the consumption site 20, whether to supply only the second soft water to the consumption site 20, and whether to supply the first soft water and the second soft water together to the consumption site 20 may be selectively determined according to circumstances. More specifically, based on at least one of a supply amount that is an amount of water supplied to the consumption site 20 or the amount of ionic materials contained in the raw water, only the first soft water may be supplied to the consumption site 20, only the second soft water may be supplied to the consumption site 20, or the first soft water and the second soft water may be supplied to the consumption site 20 together. Hereinafter, processes in which water flows according to circumstances will be described in more detail.

Figure 6:
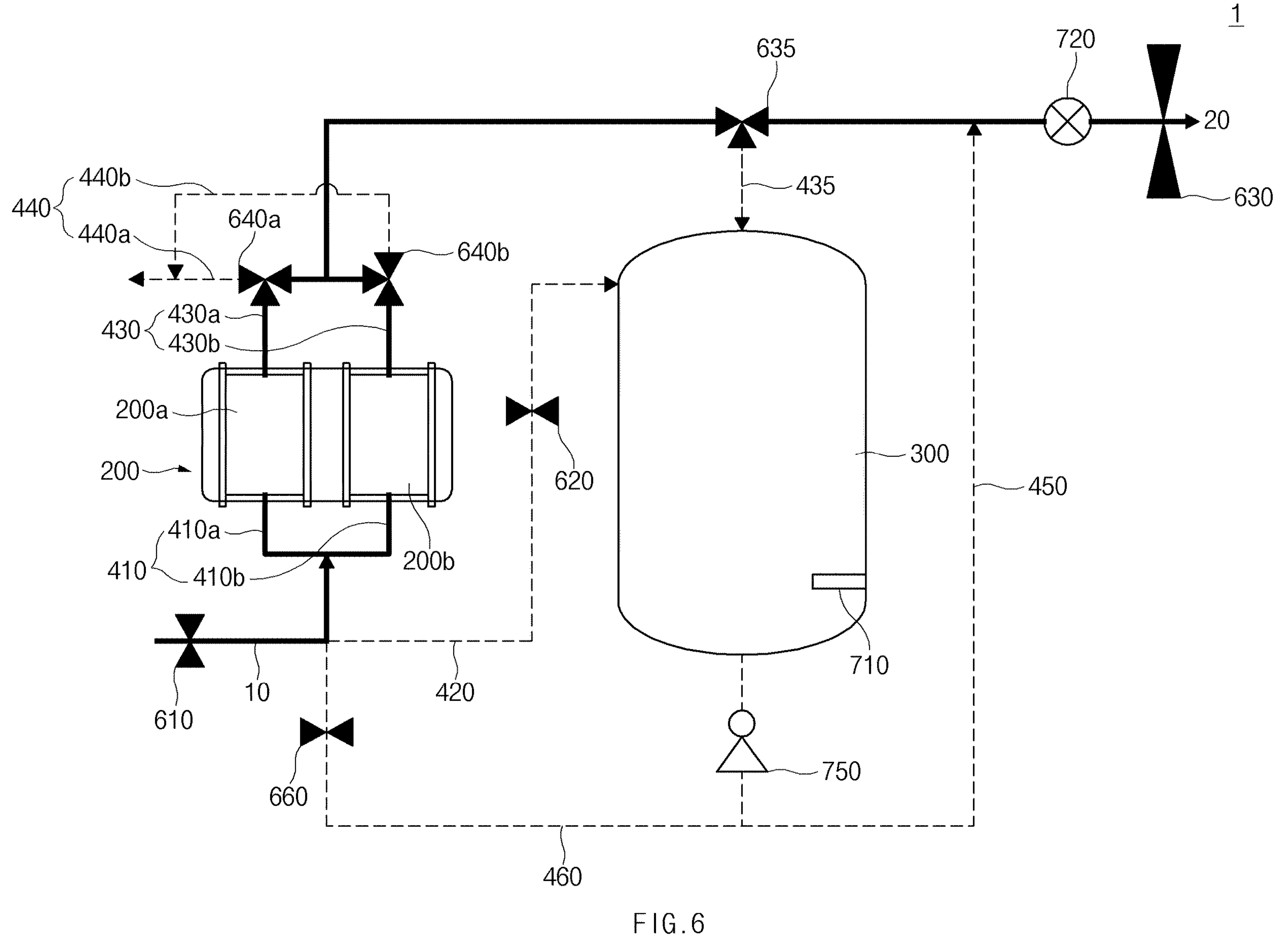
FIG. 6 is a schematic view illustrating a process in which soft water is supplied in the water softening system according to embodiment 1 of the present disclosure when the amount of water supplied to a consumption site is smaller than or equal to a reference amount.

When Amount of Water Supplied to Consumption Site is Smaller Than or Equal to Reference Amount FIG. 6 is a schematic view illustrating a process in which soft water is supplied in the water softening system according to embodiment 1 of the present disclosure when the amount of water supplied to the consumption site is smaller than or equal to a reference amount. In the following schematic views, the lines shown by thick lines refer to lines along which water flows, and the lines shown by dotted lines refer to lines along which no water flows.

When the amount of water supplied to the consumption site 20, that is, the supply amount is smaller than or equal to the reference amount, all of the raw water supplied from the main line 10 may be supplied to the filter device 200, and only the first soft water released from the filter device 200 may be supplied to the consumption site 20. Here, the reference amount is a value smaller than or equal to the maximum amount that the filter device 200 is able to receive. The reference amount refers to a preset value. For example, the reference amount may be set to about 80% of the maximum amount that the filter device 200 is able to receive. Further, the flow sensor 720 may measure the supply amount.

Because the amount that the filter device 200 is able to receive is limited, soft water from which ionic materials are not sufficiently removed may be supplied to the consumption site 20 when the supply amount is too large. However, when the supply amount is smaller than or equal to the reference amount, the filter device 200 may sufficiently receive the supplied raw water. Therefore, the second soft water released from the reservoir 300 may not be supplied to the consumption site 20, and only the first soft water may be supplied to the consumption site 20.

Meanwhile, the water softening system 1 according to embodiment 1 of the present disclosure may further include a controller (not illustrated) for controlling operation of the water softening system 1 including the valves and the pump described above, and the controller may control the water softening system 1 as follows to allow water to flow as illustrated in FIG. 6. The filter device drain-water in the table below refers to water released from the filter device, for example, the first soft water.

| Main Valve (610) | First Discharge Valve (630) | Second Supply Valve (620) | Recovery Valve (660) | Drain Valve (640) | Branch Valve (635) | Discharge Pump (750) |
|---|---|---|---|---|---|---|
| Open | Open | Close | Close | Allow filter device drain-water to flow toward valve (635) | Allow filter device drain-water to flow toward consumption site | Not operate |

When Amount of Water Supplied to Consumption Site Exceeds Reference Amount

Figure 7:
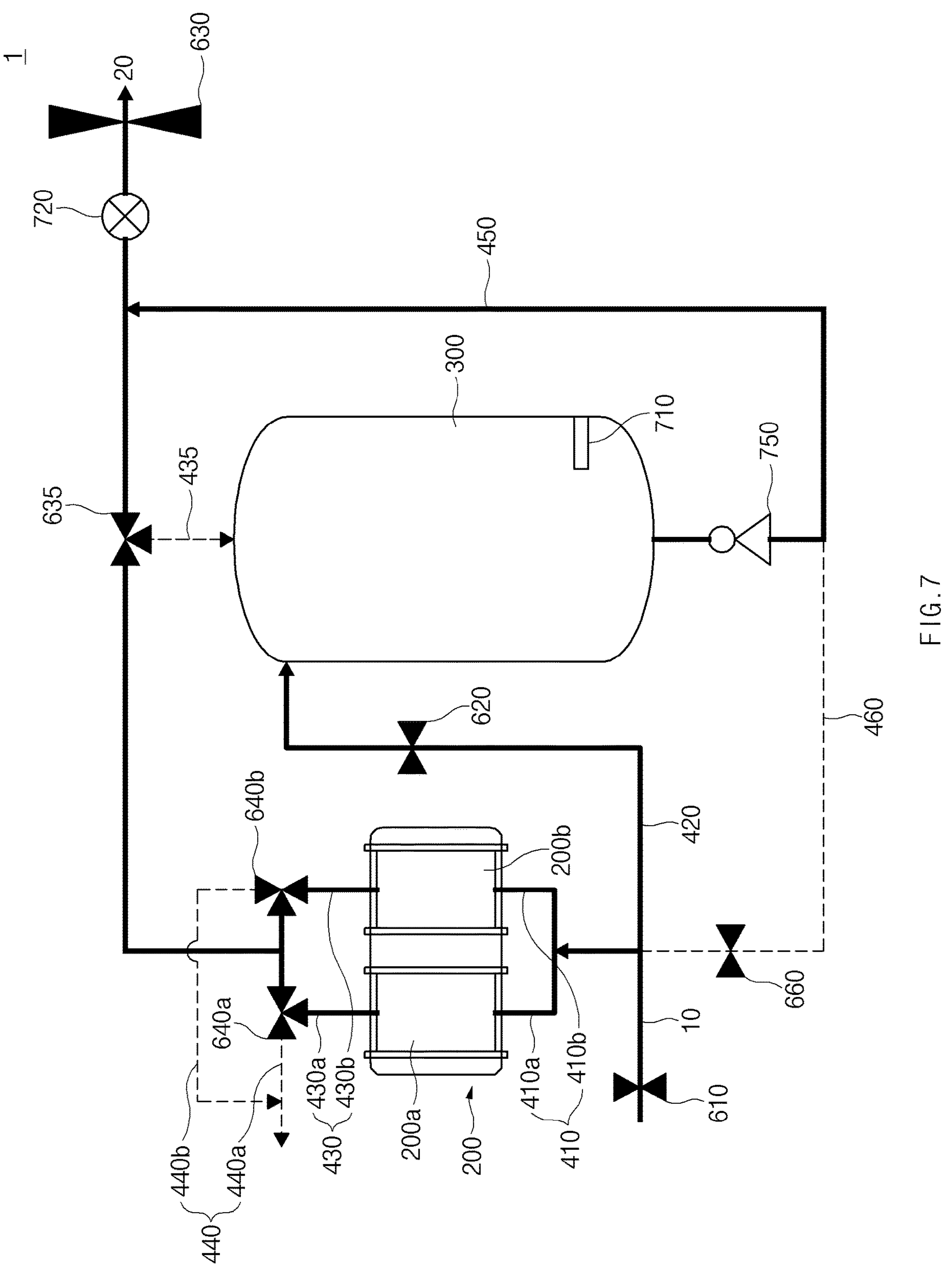
FIGS. 7 and 8 are schematic views illustrating a process in which soft water is supplied in the water softening system according to embodiment 1 of the present disclosure when the amount of water supplied to the consumption site exceeds the reference amount.
Figure 8:
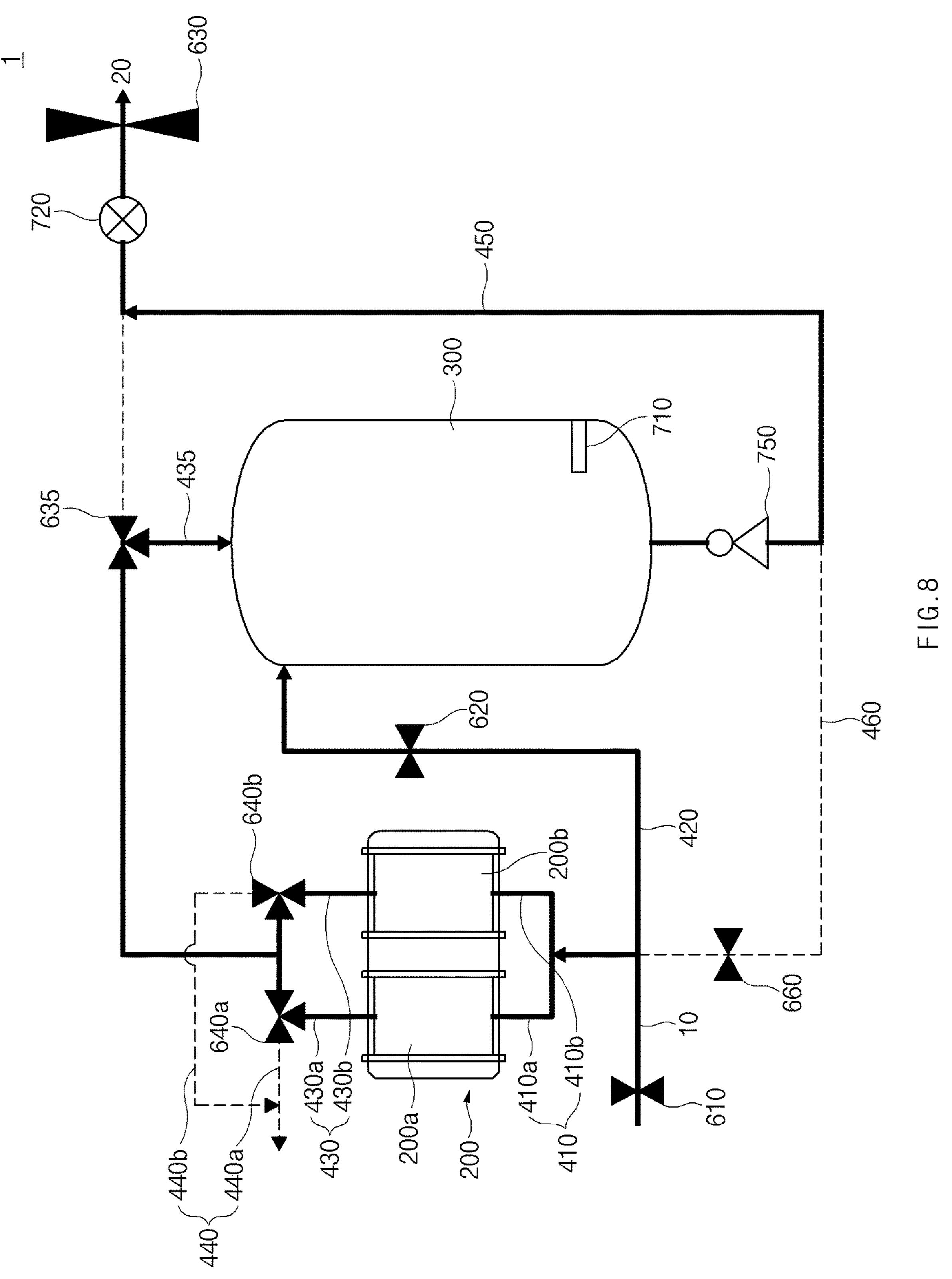

FIGS. 7 and 8 are schematic views illustrating a process in which soft water is supplied in the water softening system according to embodiment 1 of the present disclosure when the amount of water supplied to the consumption site exceeds the reference amount.

When the supply amount exceeds the reference amount, in particular, when the supply amount exceeds the maximum amount that the filter device 200 is able to receive, the removal ratio of the filter device 200, that is, the ratio of the amount of ionic materials removed by the filter device 200 to the amount of ionic materials passing through the filter device 200 may decrease. Accordingly, when only the first soft water is supplied to the consumption site 20, soft water from which ionic materials are sufficiently removed may not be able to be supplied to the consumption site 20. Therefore, only the second soft water may be supplied to the consumption site 20, or the first soft water and the second soft water may be supplied to the consumption site 20 together.

Furthermore, when the supply amount exceeds the reference amount, the first supply line 410 may not be able to receive the entire supply amount. Therefore, part of the raw water supplied from the main line 10 may be supplied to the filter device 200, and the rest may be supplied to the reservoir 300. For example, in the case of FIG. 6, an amount of 2 may be supplied from the main line 10, and only a half of the amount may be supplied to the first supply line 410. However, in the case of FIG. 7, one half of the amount supplied from the main line 10 may be supplied to the first supply line 410, and the other half may be supplied to the second supply line 420. Accordingly, in the case of FIG. 7, an amount of 2 may be supplied to the consumption site 20.

FIG. 7 is a schematic view illustrating a process of supplying the first soft water and the second soft water to the consumption site 20 together. As illustrated in FIG. 7, part of the raw water supplied from the main line 10 may be supplied to the filter device 200, and the rest may be supplied to the reservoir 300. The first soft water released from the filter device 200 may be supplied to the consumption site 20. The raw water supplied to the reservoir 300 may be mixed with the soft water stored in the reservoir 300 to form the second soft water. The second soft water may be released from the reservoir 300 and may be supplied to the consumption site 20. At this time, to allow the soft water already stored in the reservoir 300 to be preferentially supplied to the consumption site 20, the above-described partitioning part 320 may be provided in the storage space 310*a* of the reservoir 300.

The controller may control the water softening system 1 as follows to allow water to flow as illustrated in FIG. 7.

| Main Valve (610) | First Discharge Valve (630) | Second Supply Valve (620) | Recovery Valve (660) | Drain Valve (640) | Branch Valve (635) | Discharge Pump (750) |
|---|---|---|---|---|---|---|
| Open | Open | Open | Close | Allow filter device drain-water to flow toward valve (635) | Allow filter device drain-water to flow toward consumption site | Operate when necessary |

At this time, at least one of the plurality of filter modules may perform the removal mode to allow the first soft water to be consistently supplied to the consumption site 20. For example, when a drain valve 640*a* is open toward the consumption site 20 and a drain valve 640*b* is open toward the drain line 440*b*, the filter module 200*a* may perform the removal mode, and the filter module 200*b* may perform the regeneration mode.

The plurality of filter modules may all alternately perform the removal mode and the regeneration mode. However, when at least one filter module performs the removal mode, the supply amount may decrease during operation of the water softening system 1, and the raw water may not need to be supplied to the reservoir through the second supply line 420. In this case, by closing the second supply valve 620 and stopping operation of the discharge pump 750, the first soft water may be consistently supplied to the consumption site 20 through the fluid channel illustrated in FIG. 6.

Further, as described above, the second soft water may be released by the pressure of the first soft water or the raw water supplied to the reservoir 300, and therefore the discharge pump 750 does not need to necessarily operate. However, for example, when water is not sufficiently released from the reservoir 300 by only the pressure, the discharge pump 750 may be operated.

FIG. 8 is a schematic view illustrating a process of supplying only the second soft water to the consumption site 20. As illustrated in FIG. 8, part of the raw water supplied from the main line 10 may be supplied to the filter device 200, and the rest may be supplied to the reservoir 300. All of the first soft water released from the filter device 200 may be supplied to the reservoir 300. Further, the raw water and the first soft water supplied to the reservoir 300 may be mixed with the soft water stored in the reservoir 300 to form the second soft water, and only the second soft water may be supplied to the consumption site 20.

The controller may control the water softening system 1 as follows to allow water to flow as illustrated in FIG. 8.

| Main Valve (610) | First Discharge Valve (630) | Second Supply Valve (620) | Recovery Valve (660) | Drain Valve (640) | Branch Valve (635) | Discharge Pump (750) |
|---|---|---|---|---|---|---|
| Open | Open | Open | Close | Allow filter device drain-water to flow toward valve (635) | Allow filter device drain-water to flow toward reservoir (300) | Operate when necessary |

At this time, the plurality of filter modules may all alternately perform the removal mode and the regeneration mode, or at least one of the filter modules may perform the removal mode. However, when the plurality of filter modules all alternately perform the removal mode and the regeneration mode, operation of the valves may be simpler than when at least one of the filter modules performs the removal mode. Accordingly, the durability of the water softening system may be improved.

Figure 9:
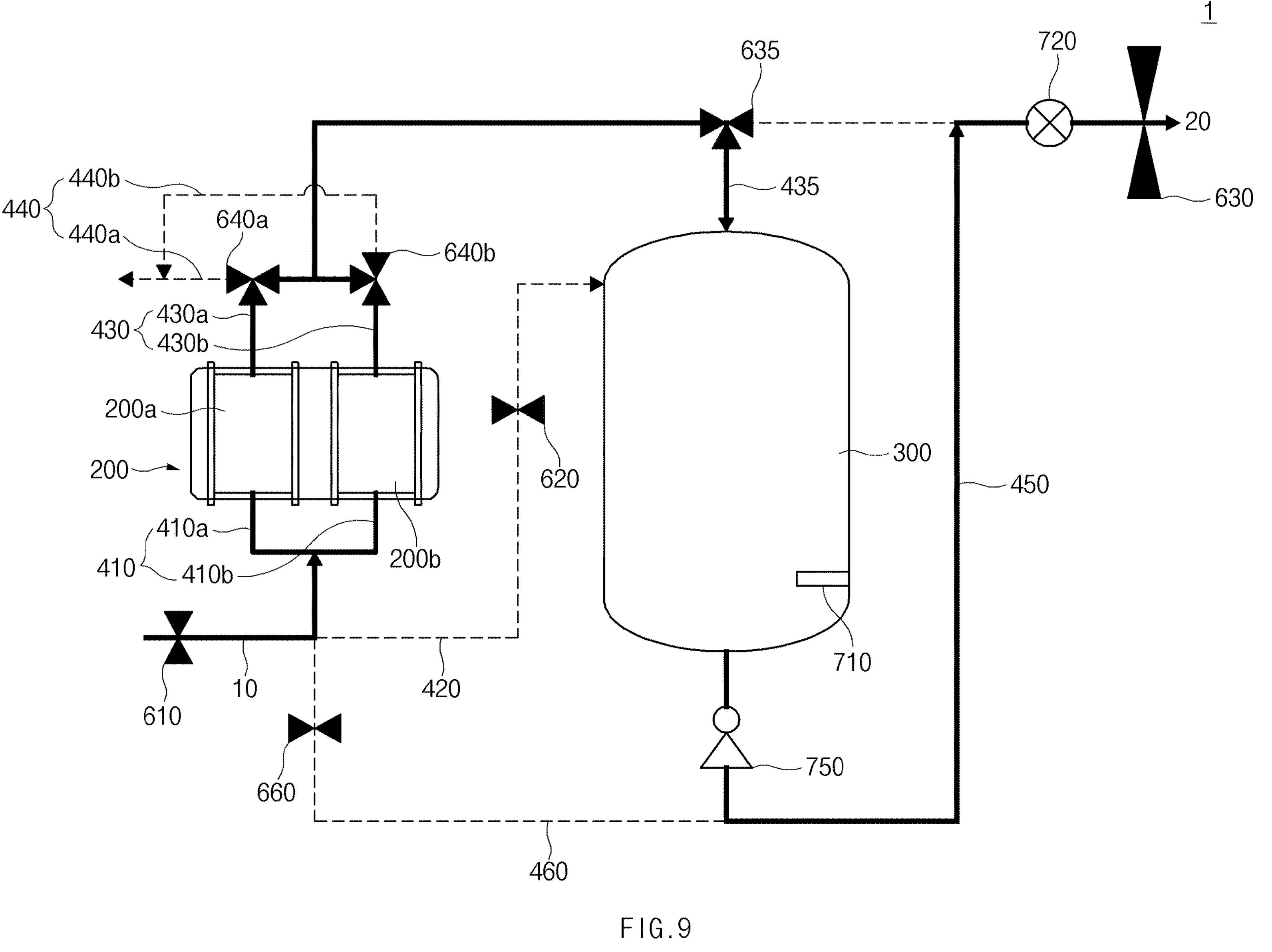
FIG. 9 is a schematic view illustrating a process in which soft water is supplied in the water softening system according to embodiment 1 of the present disclosure when the amount of ionic materials contained in raw water is smaller than or equal to a reference amount.

When Amount of Ionic Materials Contained in Raw Water is Smaller Than or Equal to Reference Amount FIG. 9 is a schematic view illustrating a process in which soft water is supplied in the water softening system according to embodiment 1 of the present disclosure when the amount of ionic materials contained in the raw water is smaller than or equal to a reference amount.

When the amount of ionic materials contained in the raw water is smaller than or equal to the reference amount, as illustrated in FIG. 9, all of the raw water supplied from the main line 10 may be supplied to the filter device 200, and all of the first soft water released from the filter device 200 may be supplied to the reservoir 300. Further, the first soft water supplied to the reservoir 300 and the soft water stored in the reservoir 300 may be mixed to form the second soft water, and only the second soft water may be supplied to the consumption site 20. Here, the reference amount, which is a preset amount input to the controller, refers to the amount of ionic materials contained in the raw water when the hardness of the raw water ranges from about 75 ppm to about 80 ppm, or when the total dissolved solid (TDS) of the raw water ranges 120 ppm to 139 ppm.

For reference, when the amount of ionic materials contained in the raw water is small, the amount of ionic materials that have to be removed by the filter device may also be small, and therefore the filter device is able to perform filtering on a larger amount.

Meanwhile, it may be difficult to directly obtain the amount of ionic materials contained in the raw water, and when the total dissolved solid (TDS) of water is high, it may mean that a large amount of ionic materials are contained in the water. That is, the amount of ionic materials contained in the water may be estimated based on the TDS of the water, and to this end, a sensor (not illustrated) that measures the TDS of the raw water may be provided.

The controller may control the water softening system 1 as follows to allow water to flow as illustrated in FIG. 9. Because all of the raw water supplied to the filter device 200 is supplied to the reservoir 300, the second soft water may be released from the reservoir 300 by the pressure. Accordingly, the pump may not operate.

| Main Valve (610) | First Discharge Valve (630) | Second Supply Valve (620) | Recovery Valve (660) | Drain Valve (640) | Branch Valve (635) | Discharge Pump (750) |
|---|---|---|---|---|---|---|
| Open | Open | Close | Close | Allow filter device drain-water to flow toward valve (635) | Allow filter device drain-water to flow toward reservoir (300) | Not operate |

When Amount of Ionic Materials in Soft Water Stored in Reservoir Exceeds Limit

As the second soft water is consistently released from the reservoir 300, ionic materials contained in the raw water or ionic materials not removed by the filter device 200 may be supplied to the reservoir 300, and therefore the ionic materials may be gradually accumulated in the soft water stored in the reservoir 300.

Meanwhile, the amount of ionic materials contained in the soft water supplied to the consumption site 20 may be set in advance to a reference value or less, and when the amount of ionic materials contained in the second soft water released from the reservoir 300 and supplied to the consumption site 20 exceeds the preset reference value due to an increase in the amount of ionic materials in the soft water stored in the reservoir 300, it may be determined that the amount of ionic materials in the soft water stored in the reservoir 300 exceeds a limit.

At this time, the controller may inform a user that the amount of ionic materials in the soft water stored in the reservoir 300 exceeds the limit.

Meanwhile, a TDS sensor 710 for measuring the TDS of the soft water stored in the reservoir 300 may be provided in the reservoir 300, and the controller may determine whether the amount of ionic materials in the soft water stored in the reservoir 300 exceeds the limit, by measuring, through the TDS sensor 710, the TDS of the soft water stored in the reservoir 300.

When Supply of Water to Consumption Site is Stopped

For example, when the supply of water to the consumption site 20 is stopped due to interruption of a water supply command in the consumption site, control to remove ionic materials contained in the soft water stored in the reservoir 300 may be performed. That is, ionic materials may be removed through the filter device 200 while the soft water stored in the reservoir 300 circulates between the filter device 200 and the reservoir 300, and therefore the soft water stored in the reservoir 300 may contain a smaller amount of ionic materials.

Figure 10:
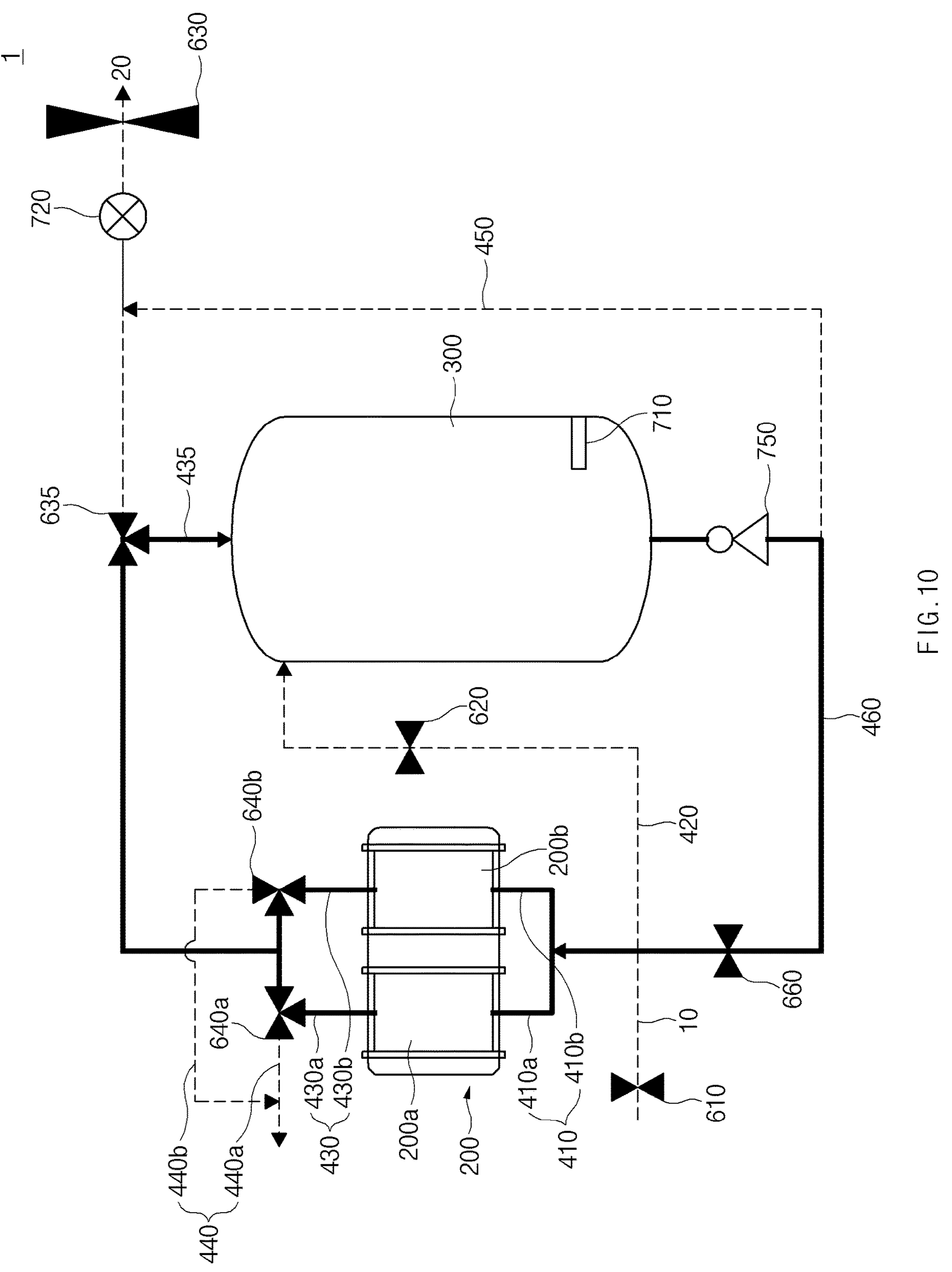
FIG. 10 is a schematic view illustrating a process of removing ionic materials from soft water stored in the reservoir of the water softening system according to embodiment 1 of the present disclosure when supply of water to the consumption site is stopped.

FIG. 10 is a schematic view illustrating a process of removing ionic materials from the soft water stored in the reservoir of the water softening system according to embodiment 1 of the present disclosure when the supply of water to the consumption site is stopped.

When the supply of water to the consumption site 20 is stopped and the filter modules 200*a* and 220*b* perform the removal mode, the soft water stored in the reservoir 300 may circulate between the reservoir 300 and the filter device 200 while sequentially passing through the recovery line 460, the first supply line 410, the filter device 200, the first discharge line 430, and the branch line 435.

The controller may control the water softening system 1 as follows to allow water to flow as illustrated in FIG. 10.

| Main Valve (610) | First Discharge Valve (630) | Second Supply Valve (620) | Recovery Valve (660) | Drain Valve (640) | Branch Valve (635) | Discharge Pump (750) |
|---|---|---|---|---|---|---|
| Close | Close | Close | Open | Allow filter device drain-water to flow toward valve (635) | Allow filter device drain-water to flow toward reservoir (300) | Operate |

Figure 11:
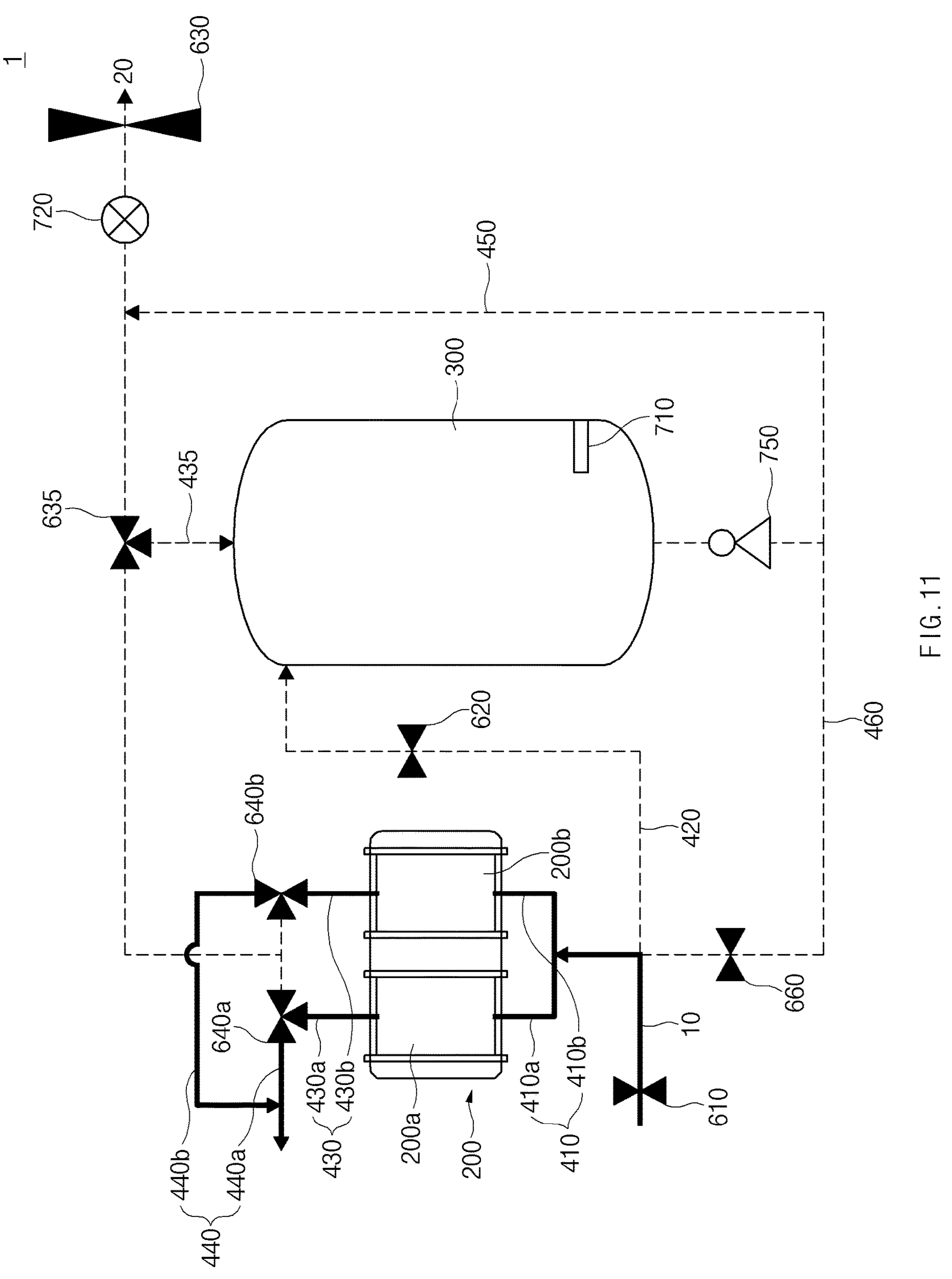
FIG. 11 is a schematic view illustrating a process of regenerating a filter device in the water softening system according to embodiment 1 of the present disclosure when supply of water to the consumption site is stopped.

FIG. 11 is a schematic view illustrating a process of regenerating the filter device in the water softening system according to embodiment 1 of the present disclosure when the supply of water to the consumption site is stopped.

When the supply of water to the consumption site 20 is stopped and the filter modules 200*a* and 200*b* perform the regeneration mode, the raw water supplied through the first supply line 410, together with ionic materials detached from the electrodes of the filter device 200, may be drained to the outside through the first discharge line 430 and the drain line 440 while passing through the filter device 200.

The controller may control the water softening system 1 as follows to allow water to flow as illustrated in FIG. 11.

| Main Valve (610) | First Discharge Valve (630) | Second Supply Valve (620) | Recovery Valve (660) | Drain Valve (640) | Branch Valve (635) | Discharge Pump (750) |
|---|---|---|---|---|---|---|
| Open | Close | Close | Close | Allow filter device drain-water to flow toward drain line (440) | Irrelevant | Not operate |

Embodiment 2

Figure 12:
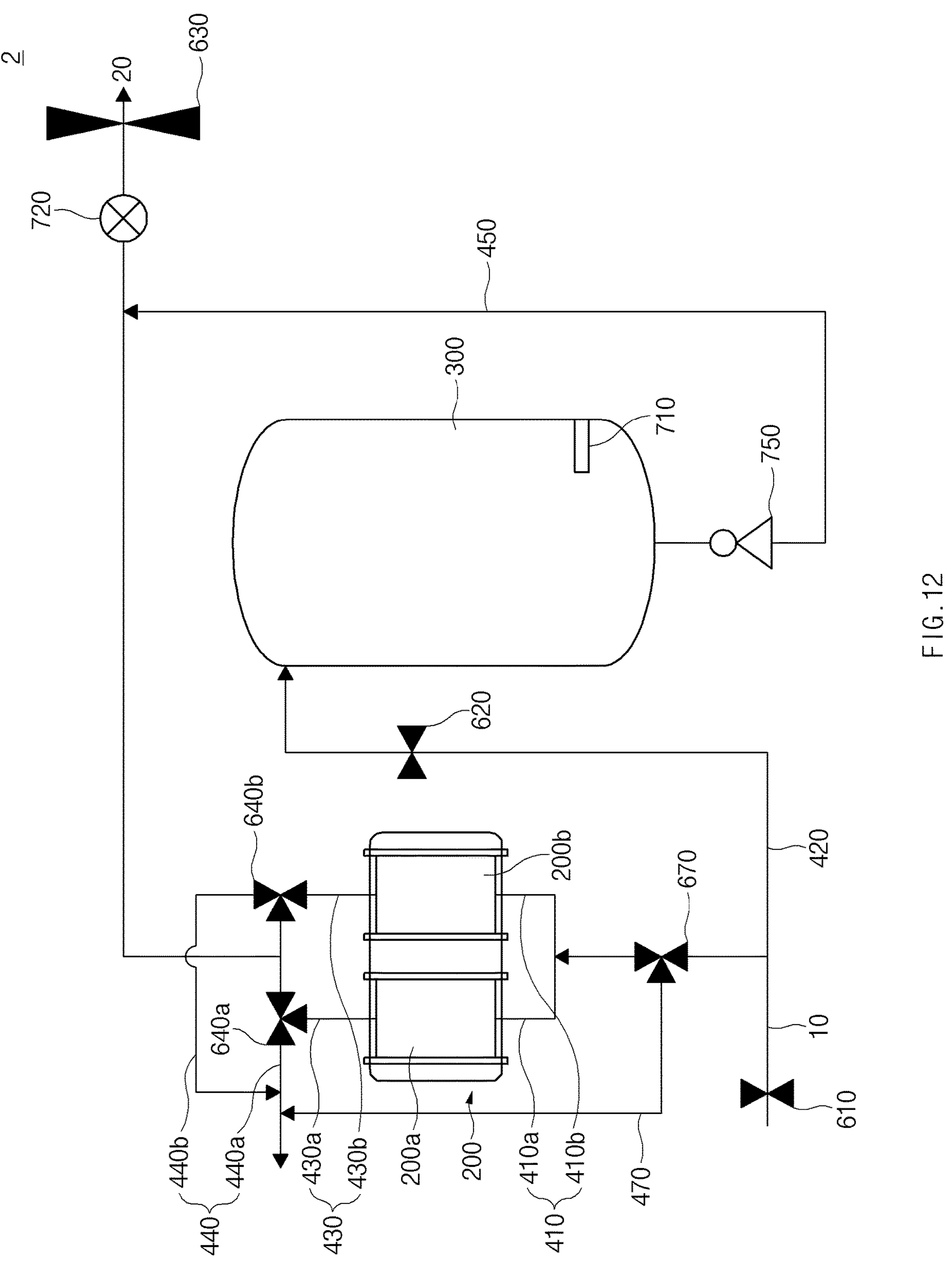
FIG. 12 is a view illustrating a configuration of a water softening system according to embodiment 2 of the present disclosure.

FIG. 12 is a view illustrating a configuration of a water softening system according to embodiment 2 of the present disclosure. The water softening system according to embodiment 2 of the present disclosure differs from the water softening system according to embodiment 1 in that the former does not include a branch line and a recovery line and further includes a second drain line. Furthermore, depending on the difference, there is a difference in a method by which the water softening system is controlled. Components identical or corresponding to the components of the water softening system according to embodiment 1 are denoted by identical or corresponding reference numerals, and specific descriptions thereabout will be omitted.

Referring to FIG. 12, the water softening system 2 according to embodiment 2 of the present disclosure may include a filter device 200, a reservoir 300, a first supply line 410, a second supply line 420, a first discharge line 430, a first drain line 440, the second drain line 470, and a second discharge line 450.

The first supply line 410 refers to a line for supplying raw water from the main line 10 to a front end of the filter device 200. The first supply line 410 may be split into a plurality of lines to supply the raw water to filter modules 200*a* and 200*b*.

A main valve 610 may be provided in the main line 10, and the raw water may or may not be supplied to the water softening system 2 depending on opening or closing of the main valve 610.

The second supply line 420 refers to a line that branches off from the first supply line 410 or the main line 10 and supplies the raw water to the reservoir 300. A second supply valve 620 may be provided in the second supply line 420, and the raw water may or may not be supplied to the reservoir 300 depending on opening or closing of the second supply valve 620.

The first discharge line 430 refers to a line that guides the water released from the filter device 200 to the consumption site 20, and the first drain line 440 refers to a line that branches off from the first discharge line 430 to drain the water released from the filter device 200 to the outside. The first discharge line 430 may also include a plurality of lines connected to the plurality of filter modules 200*a* and 200*b*, and the plurality of lines may be integrated into one line. Further, the first drain line 440 may also branch off from a plurality of first discharge lines 430*a* and 430*b* connected to the plurality of filter modules 200*a* an 200*b*.

A first discharge valve 630 may be provided at a distal end on a downstream side of the first discharge line 430, and the water flowing along the first discharge line 430 may or may not be supplied to the consumption site 20 depending on opening or closing of the first discharge valve 630.

A three-way valve may be provided as a drain valve 640 at the point where the first discharge line 430 and the first drain line 440 meet, and the direction of the water released from the filter device 200 may be determined by opening the first drain valve 640 toward the consumption site 20 or by opening the first drain valve 640 toward the first drain line 440.

The second drain line 470 refers to a line that branches off from the first supply line 410 and connects to the first drain line 440. A three-way valve may be provided as a drain valve 670 at the point where the first supply line 410 and the second drain line 470 meet, and the flow direction of the water flowing through a first supply passage may be determined by opening the second drain valve 670 toward the filter device 200 or by opening the second drain valve 670 toward the second drain line 470.

The second discharge line 450 refers to a line connected from the reservoir 300 to the first discharge line 430. A discharge pump 750 may be provided in the second discharge line 450, and second soft water may be released from the reservoir 300 by operation of the discharge pump 750.

Hereinafter, processes in which water flows according to circumstances as in embodiment 1 will be described in more detail.

Figure 13:
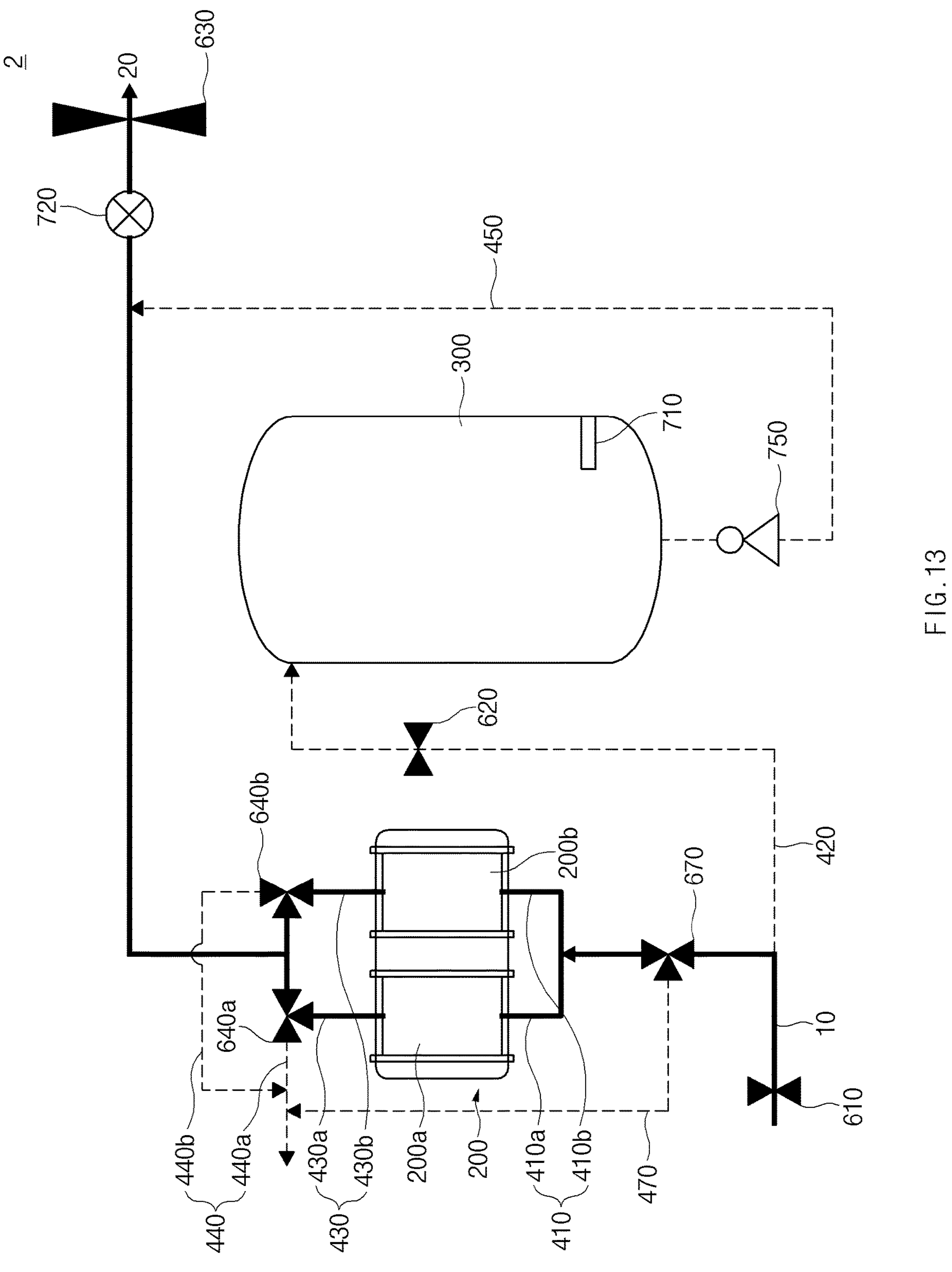
FIG. 13 is a schematic view illustrating a process in which soft water is supplied in the water softening system according to embodiment 2 of the present disclosure when the amount of water supplied to a consumption site is smaller than or equal to a reference amount.

When Amount of Water Supplied to Consumption Site is Smaller Than or Equal to Reference Amount FIG. 13 is a schematic view illustrating a process in which soft water is supplied in the water softening system according to embodiment 2 of the present disclosure when the amount of water supplied to the consumption site is smaller than or equal to a reference amount.

When the amount of water supplied to the consumption site 20, that is, the supply amount is smaller than or equal to the reference amount, all of the raw water supplied from the main line 10 may be supplied to the filter device 200, and only the first soft water released from the filter device 200 may be supplied to the consumption site 20.

A controller may control the water softening system 2 as follows to allow water to flow as illustrated in FIG. 13.

| Main Valve (610) | First Discharge Valve (630) | Second Supply Valve (620) | First Drain Valve (640) | Second Drain Valve (670) | Discharge Pump (750) |
|---|---|---|---|---|---|
| Open | Open | Close | Allow filter device drain-water to flow toward consumption site | Allow raw water to flow toward filter device | Not operate |

When Amount of Water Supplied to Consumption Site Exceeds Reference Amount

Figure 14:
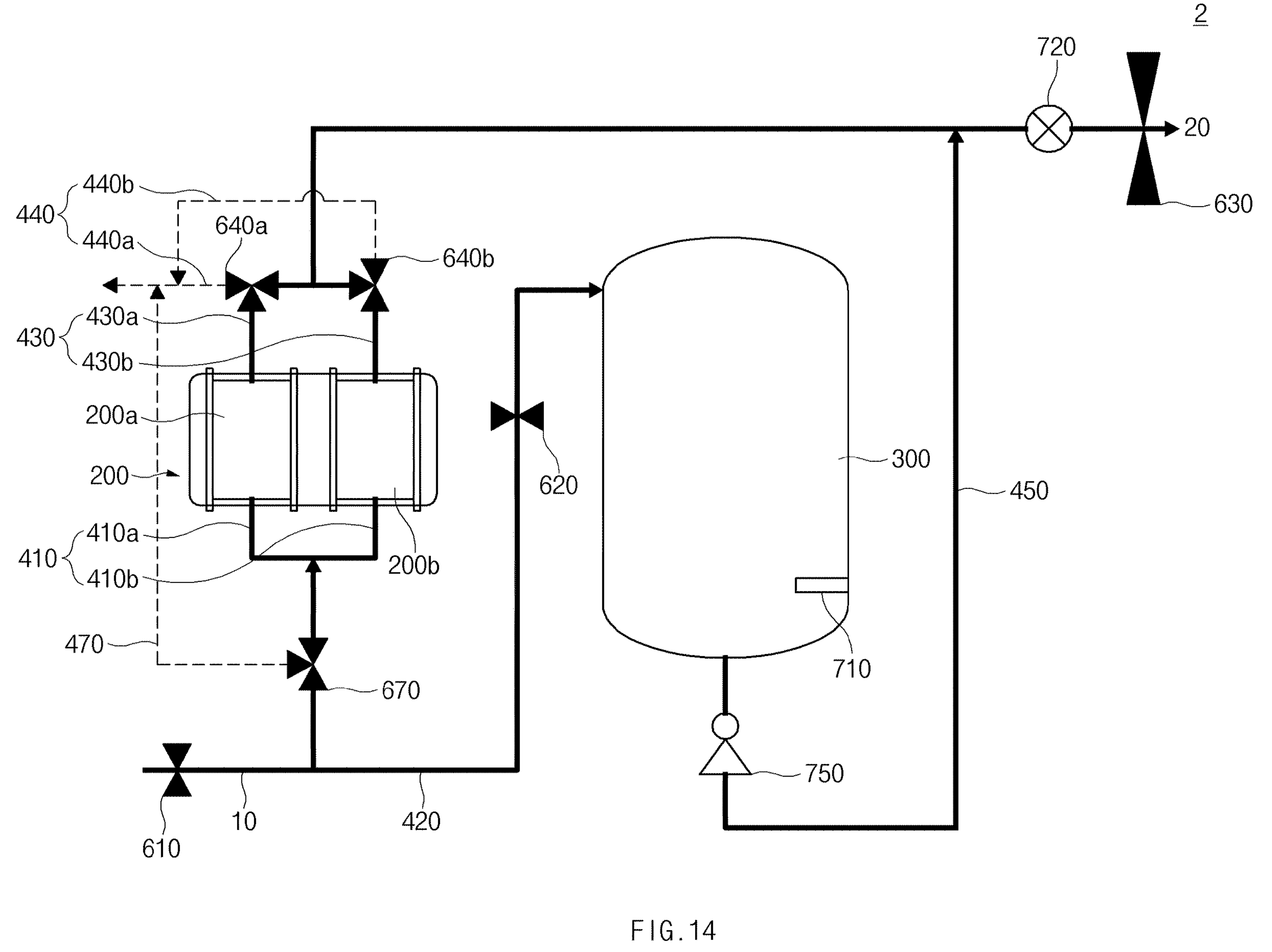
FIG. 14 is a schematic view illustrating a process in which soft water is supplied in the water softening system according to embodiment 2 of the present disclosure when the amount of water supplied to the consumption site exceeds the reference amount.

FIG. 14 is a schematic view illustrating a process in which soft water is supplied in the water softening system according to embodiment 2 of the present disclosure when the amount of water supplied to the consumption site exceeds the reference amount.

In a case where the supply amount exceeds the reference amount, in particular, in a case where the supply amount exceeds the maximum amount that the filter device 200 is able to receive, when only the first soft water is supplied to the consumption site 20, soft water from which ionic materials are sufficiently removed may not be able to be supplied to the consumption site 20. Therefore, the first soft water and the second soft water may be supplied to the consumption site 20 together.

As illustrated in FIG. 14, part of the raw water supplied from the main line 10 may be supplied to the filter device 200, and the rest may be supplied to the reservoir 300. Further, the first soft water released from the filter device 200 may be supplied to the consumption site 20. The raw water supplied to the reservoir 300 may be mixed with the soft water stored in the reservoir 300 to form the second soft water. The second soft water may be released from the reservoir 300 and may be supplied to the consumption site 20.

The controller may control the water softening system 2 as follows to allow water to flow as illustrated in FIG. 14.

| Main Valve (610) | First Discharge Valve (630) | Second Supply Valve (620) | First Drain Valve (640) | Second Drain Valve (670) | Discharge Pump (750) |
|---|---|---|---|---|---|
| Open | Open | Open | Allow filter device drain-water to flow toward consumption site | Allow raw water to flow toward filter device | Operate when necessary |

At this time, at least one of the plurality of filter modules may perform the removal mode to allow the first soft water to be consistently supplied to the consumption site 20.

When Supply of Water to Consumption Site is Stopped

When the supply of water to the consumption site 20 is stopped, control to remove ionic materials contained in the soft water stored in the reservoir 300 may be performed. That is, ionic materials may be removed through the filter device 200 while the soft water stored in the reservoir 300 circulates between the filter device 200 and the reservoir 300, and therefore the soft water stored in the reservoir 300 may contain a smaller amount of ionic materials.

Figure 15:
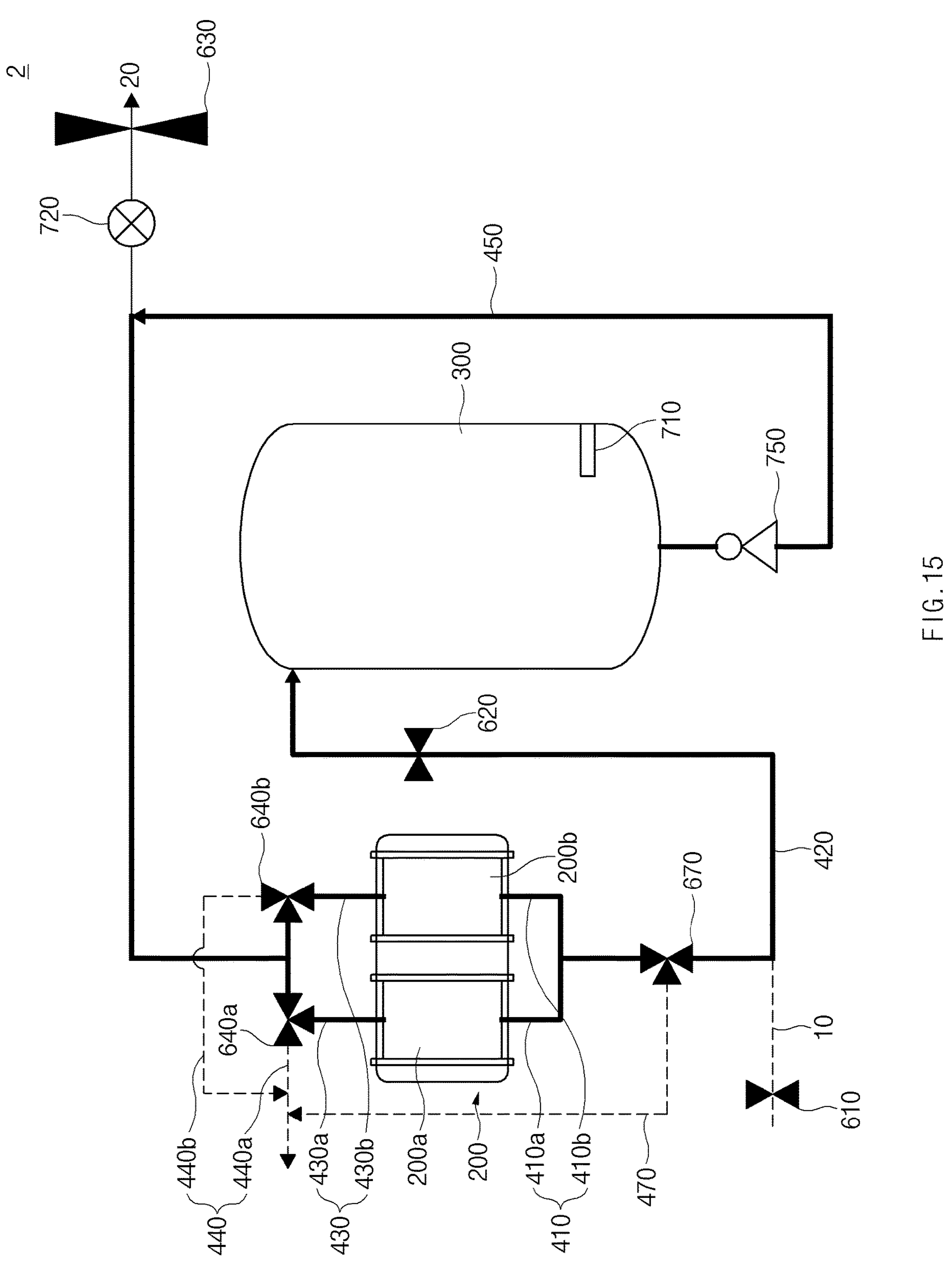
FIG. 15 is a schematic view illustrating a process of removing ionic materials from soft water stored in a reservoir of the water softening system according to embodiment 2 of the present disclosure when supply of water to the consumption site is stopped.

FIG. 15 is a schematic view illustrating a process of removing ionic materials from soft water stored in the reservoir of the water softening system according to embodiment 2 of the present disclosure when the supply of water to the consumption site is stopped.

When the supply of water to the consumption site 20 is stopped and the filter modules perform the removal mode, the soft water stored in the reservoir 300 may circulate between the reservoir 300 and the filter device 200 while sequentially passing through the second discharge line 450, the first discharge line 430, the filter device 200, the first supply line 410, and the second supply line 420.

The controller may control the water softening system 2 as follows to allow water to flow as illustrated in FIG. 15. The reservoir drain-water in the table below refers to water released from the reservoir, for example, the second soft water.

| Main Valve (610) | First Discharge Valve (630) | Second Supply Valve (620) | First Drain Valve (640) | Second Drain Valve (670) | Discharge Pump (750) |
|---|---|---|---|---|---|
| Close | Close | Open | Allow reservoir drain-water to flow toward filter device | Allow filter device drain-water to flow toward reservoir | Operate |

Figure 16:
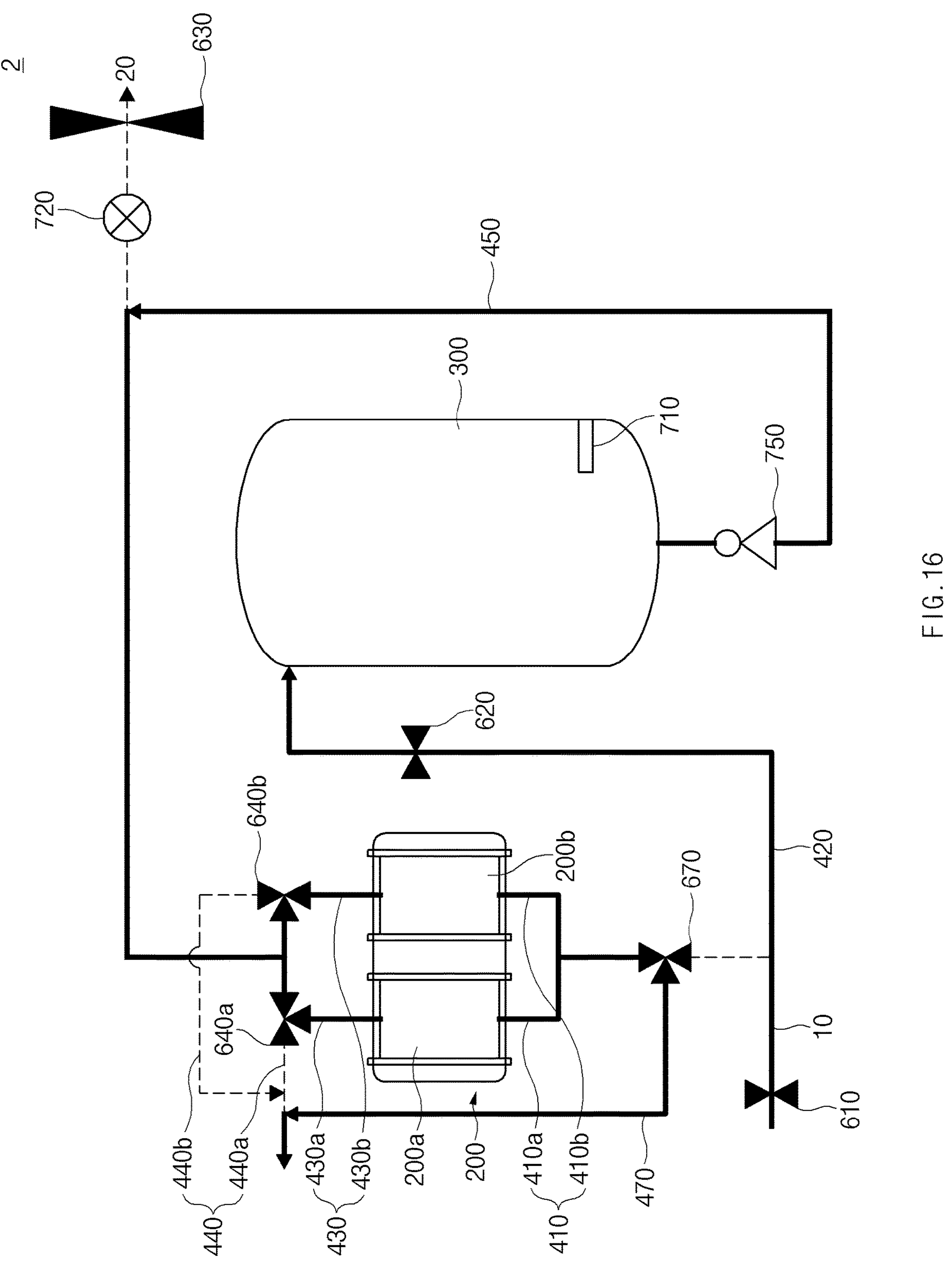
FIG. 16 is a schematic view illustrating a process of regenerating a filter device in the water softening system according to embodiment 2 of the present disclosure when supply of water to the consumption site is stopped.

FIG. 16 is a schematic view illustrating a process of regenerating the filter device in the water softening system according to embodiment 2 of the present disclosure when the supply of water to the consumption site is stopped.

When the supply of water to the consumption site 20 is stopped and the filter modules perform the regeneration mode, the raw water may be supplied to the reservoir 300 through the second supply line 420, and the soft water stored in the reservoir 300 may be supplied to the filter device 200 through the second discharge line 450 and the first discharge line 430 and, together with ionic materials detached from the electrodes of the filter device 200, may be released to the first supply line 410 while passing through the filter device 200. Further, the soft water may be drained to the outside through the second drain line 470 and the first drain line 440.

The controller may control the water softening system 2 as follows to allow water to flow as illustrated in FIG. 16.

| Main Valve (610) | First Discharge Valve (630) | Second Supply Valve (620) | First Drain Valve (640) | Second Drain Valve (670) | Discharge Pump (750) |
|---|---|---|---|---|---|
| Open | Close | Open | Allow reservoir drain-water to flow toward filter device | Allow filter device drain-water to flow toward drain line (470) | Operate |

However, without being limited to the control method, the controller may regenerate the filter modules by forming a fluid channel as illustrated in FIG. 11. That is, the raw water supplied from the main line 10 to the first supply line 410, together with ionic materials detached from the electrodes of the filter device 200, may be drained to the outside through the first discharge line 430 and the drain line 440 while passing through the filter device 200. The second drain line 470 is unnecessary for this control.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A water softening system connected to a main line configured to supply raw water to a consumption site, wherein the water softening system removes at least part of an ionic material contained in the raw water supplied through the main line and supplies soft water containing a smaller amount of ionic material than the raw water to the consumption site, the water softening system comprising:

a filter device configured to receive water derived from the raw water, remove at least part of an ionic material contained in the received water based on an electric force, and release first soft water containing a smaller amount of ionic material than the received water;

a reservoir configured to store the first soft water supplied from the filter device and release second soft water derived from the stored first soft water, wherein at least one of the first soft water or the second soft water is supplied to the consumption site;

a first supply line configured to supply the raw water from the main line to a front end of the filter device;

a first discharge line configured to guide water released from the filter device to the consumption site;

a second supply line configured to branch off from the first supply line and supply the raw water to the reservoir;

a second discharge line connected from the reservoir to the first discharge line; and a controller configured to control the water softening system based on at least one of a supply amount of water supplied to the consumption site or an amount of the ionic material contained in the raw water, to selectively operate the water softening system in one of: a first mode, in which only the first soft water is supplied to the consumption site through the first discharge line; a second mode, in which only the second soft water is supplied to the consumption site through the second discharge line; and a third mode, in which the first soft water and the second soft water are together supplied to the consumption site through the first discharge line and the second discharge line, wherein when the supply amount exceeds a reference amount, the controller is configured to operate the water softening system in the second mode or the third mode, and is further configured to supply part of the raw water supplied from the main line to the filter device and to supply the rest of the raw water to the reservoir, and wherein the second supply line is connected to one side of the reservoir while being separated from the first discharge line and the second discharge line is connected to the other side of the reservoir such that the second soft water is supplied from the reservoir to the consumption site through the second discharge line, and the rest of the raw water is supplied from the main line to the reservoir through the second supply line without being mixed with the first soft water.

2. The water softening system of claim 1, wherein when the supply amount is smaller than or equal to the reference amount, the controller is configured to supply all of the raw water supplied from the main line to the filter device, and supply only the first soft water released from the filter device to the consumption site.

3. The water softening system of claim 1, wherein when the supply amount exceeds the reference amount, the controller is configured to supply the first soft water released from the filter device and the second soft water formed by mixing the raw water supplied to the reservoir and the soft water stored in the reservoir to the consumption site together.

4. The water softening system of claim 1, wherein when the supply amount exceeds the reference amount, the controller is configured to supply all of the first soft water released from the filter device to the reservoir, and supply only the second soft water formed by mixing the raw water supplied to the reservoir and the soft water stored in the reservoir to the consumption site.

5. The water softening system of claim 3, wherein the filter device includes a plurality of filter modules provided in parallel such that inlets through which water is supplied connect to each other and outlets through which the water is released connect to each other, wherein the filter modules are configured to selectively perform one of a removal mode in which the ionic material is removed by an electro-deionization method through electrodes and a regeneration mode in which the electrodes are regenerated, and wherein at least one of the plurality of filter modules are configured to perform the removal mode.

6. The water softening system of claim 3, wherein the filter device includes a plurality of filter modules provided in parallel such that inlets through which water is supplied connect to each other and outlets through which the water is released connect to each other, wherein the filter modules are configured to selectively perform one of a removal mode in which the ionic material is removed by an electro-deionization method through electrodes and a regeneration mode in which the electrodes are regenerated, and wherein the plurality of filter modules all are configured to alternately perform the removal mode and the regeneration mode.

7. The water softening system of claim 1, wherein when the amount of the ionic material contained in the raw water is smaller than or equal to a reference amount that is a preset amount, the controller is configured to supply all of the raw water supplied from the main line to the filter device, supply all of the first soft water released from the filter device to the reservoir, and supply only the second soft water formed by mixing the first soft water supplied to the reservoir and the soft water stored in the reservoir to the consumption site.

8. The water softening system of claim 1, wherein the filter device is configured to selectively perform one of a removal mode in which the ionic material is removed by an electro-deionization method through electrodes and a regeneration mode in which the electrodes are regenerated.

9. The water softening system of claim 8, wherein when supply of water to the consumption site is stopped, the controller is configured to circulate the soft water stored in the reservoir between the filter device and the reservoir and control the filter device to remove an ionic material from the soft water stored in the reservoir such that the soft water stored in the reservoir contains a smaller amount of ionic material.

10. The water softening system of claim 9, further comprising:

a drain line configured to branch off from the first discharge line to drain the water released from the filter device to the outside;

a branch line configured to branch off from the first discharge line and connect to the reservoir; and a recovery line connected from the reservoir to the first supply line, wherein when supply of water to the consumption site is stopped and the filter device performs the removal mode, the controller is configured to circulate the soft water stored in the reservoir between the reservoir and the filter device while sequentially passing through the recovery line, the first supply line, the filter device, the first discharge line, and the branch line, and wherein when the supply of the water to the consumption site is stopped and the filter device performs the regeneration mode, the controller drains the raw water supplied through the first supply line, together with an ionic material detached from the electrodes of the filter device, to the outside through the first discharge line and the drain line while passing through the filter device.

11. The water softening system of claim 9, further comprising:

a first supply line configured to supply the raw water from the main line to a front end of the filter device;

a first discharge line configured to guide water released from the filter device to the consumption site;

a first drain line configured to branch off from the first discharge line to drain the water released from the filter device to the outside; and a second drain line configured to branch off from the first supply line and connect to the first drain line, wherein when supply of water to the consumption site is stopped and the filter device performs the removal mode, the controller is configured to circulate the soft water stored in the reservoir between the reservoir and the filter device while sequentially passing through the second discharge line, the first discharge line, the filter device, the first supply line, and the second supply line, and wherein when the supply of the water to the consumption site is stopped and the filter device performs the regeneration mode, the controller is configured to supply the soft water stored in the reservoir to the filter device through the second discharge line and the first discharge line, release the soft water supplied to the filter device to the first supply line, together with an ionic material detached from the electrodes of the filter device, while passing through the filter device, and drain the soft water released to the first supply line to the outside through the second drain line and the first drain line.

12. The water softening system of claim 8, wherein the filter device includes a plurality of filter modules provided in parallel such that inlets through which water is supplied connect to each other and outlets through which the water is released connect to each other, and wherein each of the plurality of filter modules is controlled such that time during which the removal mode is performed is longer than time during which the regeneration mode is performed.

13. The water softening system of claim 12, wherein the filter modules are controlled such that magnitude of power supplied to the electrodes in the regeneration mode is greater than magnitude of power supplied to the electrodes in the removal mode.

14. The water softening system of claim 1, further comprising:

a filter provided in front of the water softening system and/or behind the water softening system and configured to remove physical foreign matter contained in the raw water to be supplied to the water softening system or the soft water to be released from the water softening system to the consumption site.

15. The water softening system of claim 1, wherein the reservoir includes:

a main body having a storage space;

a water outlet provided at the main body to release soft water stored in the storage space to the outside of the main body;

a water inlet provided at the main body to supply water into the storage space; and a partitioning part configured to partition the storage space to hinder supplementary water from flowing toward the water outlet when the supplementary water is supplied into the storage space through the water inlet as the soft water stored in the storage space is released through the water outlet.

16. The water softening system of claim 4, wherein the filter device includes a plurality of filter modules provided in parallel such that inlets through which water is supplied connect to each other and outlets through which the water is released connect to each other, wherein the filter modules are configured to selectively perform one of a removal mode in which the ionic material is removed by an electro-deionization method through electrodes and a regeneration mode in which the electrodes are regenerated, and wherein at least one of the plurality of filter modules is configured to perform the removal mode.

17. The water softening system of claim 4, wherein the filter device includes a plurality of filter modules provided in parallel such that inlets through which water is supplied connect to each other and outlets through which the water is released connect to each other, wherein the filter modules are configured to selectively perform one of a removal mode in which the ionic material is removed by an electro-deionization method through electrodes and a regeneration mode in which the electrodes are regenerated, and wherein the plurality of filter modules all are configured to alternately perform the removal mode and the regeneration mode.

* * * * *